United States Patent [19]
Jonstromer

[11] Patent Number: 6,142,369
[45] Date of Patent: *Nov. 7, 2000

[54] ELECTRONIC TRANSACTION TERMINAL FOR CONDUCTING ELECTRONIC FINANCIAL TRANSACTIONS USING A SMART CARD

[75] Inventor: Ulf Jonstromer, Stockholm, Sweden

[73] Assignee: Au-System, Stockholm, Sweden

[*] Notice: This patent issued on a continued prosecution application filed under 37 CFR 1.53(d), and is subject to the twenty year patent term provisions of 35 U.S.C. 154(a)(2).

[21] Appl. No.: 08/930,611
[22] PCT Filed: Mar. 29, 1996
[86] PCT No.: PCT/SE96/00414
  § 371 Date: Oct. 14, 1997
  § 102(e) Date: Oct. 14, 1997
[87] PCT Pub. No.: WO96/32700
  PCT Pub. Date: Oct. 17, 1996

[30] Foreign Application Priority Data
Apr. 11, 1995 [SE] Sweden ................... 9501347

[51] Int. Cl.⁷ ........................................ G06K 5/00
[52] U.S. Cl. .................. 235/380; 235/379; 705/41
[58] Field of Search ..................... 235/379, 380, 235/375, 383, 384, 441, 449, 451, 492, 493; 902/22, 23, 24, 26, 27; 705/17, 39, 41, 44, 13; 380/24

[56] References Cited
U.S. PATENT DOCUMENTS

| | | | |
|---|---|---|---|
| 4,277,837 | 7/1981 | Stuckert | 235/379 X |
| 4,341,951 | 7/1982 | Benton | 235/379 |
| 4,861,971 | 8/1989 | Chan | 235/384 |
| 4,877,947 | 10/1989 | Mori | 235/381 |
| 5,221,838 | 6/1993 | Gutman et al. | 235/379 |
| 5,237,612 | 8/1993 | Raith | 380/23 |
| 5,266,782 | 11/1993 | Alanara et al. | 235/380 |
| 5,336,870 | 8/1994 | Hughes et al. | 235/379 |
| 5,351,187 | 9/1994 | Hassett | 705/13 |

(List continued on next page.)

FOREIGN PATENT DOCUMENTS

| | | |
|---|---|---|
| 0481714 A2 | 4/1992 | European Pat. Off. . |
| 0 556 970 A1 | 8/1993 | European Pat. Off. . |
| 467559 | 8/1992 | Sweden . |
| WO 9408433 A1 | 4/1994 | WIPO . |
| WO 9411849 A1 | 5/1994 | WIPO . |

OTHER PUBLICATIONS

Utlandsrapport Fran Sveriges Tekniska Attacher, Frankrike 9301, Nya frnaska kort, Tillampningar av IC–kort Dec. 1993.

Smart Cards in GSM by Ivan Donn, Elektron, Feb. 1994.

*Primary Examiner*—Michael G Lee
*Assistant Examiner*—Jared J. Fureman
*Attorney, Agent, or Firm*—Oblon, Spivak, McClelland, Maier & Neustadt, P.C.

[57] ABSTRACT

An electronic transaction system for conducting electronic financial transactions including a smart card configured to store a plurality of payer electronic credits and a communication module configured to transmit the electronic credits from the smart card to a party selected from a plurality of addressable parties accessible through a Public Switched Telephone Network. The smart card having a storage device configured to store the electronic credits and a computational device configured to debit or credit the electronic credits. The communications module including an actuation device configured to generate a signal for transmitting the electronic credits to the party, a routing device configured to produce an address of the party, a video display unit configured to display credit transfer data, and a keypad configured to enter details of an electronic transfer. Wherein, the payer remains in physical control of the smart cart at all times during conduct of the transaction.

20 Claims, 2 Drawing Sheets

U.S. PATENT DOCUMENTS

| | | | |
|---|---|---|---|
| 5,359,182 | 10/1994 | Schilling | 235/380 |
| 5,367,150 | 11/1994 | Kitta et al. | 235/380 |
| 5,461,217 | 10/1995 | Claus | 235/380 |
| 5,550,358 | 8/1996 | Tait et al. | 235/380 |
| 5,559,887 | 9/1996 | Davis et al. | 380/24 |
| 5,590,038 | 12/1996 | Pitroda | 235/380 X |
| 5,591,949 | 1/1997 | Berstein | 235/380 |
| 5,608,778 | 3/1997 | Pattridge, III | 379/58 |
| 5,623,547 | 4/1997 | Jones et al. | 380/24 |
| 5,635,695 | 6/1997 | Feiken | 235/380 |
| 5,696,909 | 12/1997 | Wallner | 705/44 |

ELECTRONIC TRANSACTION TERMINAL FOR CONDUCTING ELECTRONIC FINANCIAL TRANSACTIONS USING A SMART CARD

BACKGROUND OF THE INVENTION

The present invention relates to an electronic wallet, equipment associated therewith, and a method of using an electronic wallet.

The use of smart cards as electronic wallets is well known. A smart card can store electronic credits, representing money, which can be transferred by electronic means from a payer, the owner of the smart card, to a payee, the person with whom a cash transaction is conducted. However, in order to conduct a transaction with an electronic wallet, it is necessary to hand the wallet over to the payee, who will then insert the wallet (smart card) into a till having a smart card reader, enter the sum to be paid into the till which will then deduct the sum from the credits held on the smart card. In cash terms, this amounts to paying for a meal in a restaurant by handing a wallet, containing cash in the form of bank notes to a waiter, allowing him to take the wallet away and remove the cash from it necessary to pay the bill. From the point of view of the payer, this is not entirely a satisfactory way of conducting a cash transaction and entails placing a great deal of trust in the payee.

The use of mobile telephones is now well established. Many mobile telephone systems use SIMs, subscriber information modules, which are in the form of smart cards. A SIM carries a variety of information about a mobile telephone subscriber and the service he is entitled to access. SIMs are usually protected by a PIN (personal identity number), and include encryption algorithms and keys. To use a particular mobile telephone, a subscriber inserts his SIM into the telephone and enters his PIN, service is then available to him from the mobile telephone into which the SIM has been inserted. A similar system can be used to give a subscriber access to a payphone. Transmission over modern digital mobile telephone systems, such as the GSM system, is encrypted. The encryption employed frequently involves the use of asymmetric cyphers, which enable both secure encryption and the use of secure electronic signatures.

SUMMARY OF THE INVENTION

The present invention avoids the need for a payer to pass his electronic wallet to a payee, by providing a facility to link payer and payee through a mobile telecommunications network and the PSTN. The payer inserts his electronic wallet into a mobile phone, dials the payees telephone number and transfers the requisite sum of money, in the form of electronic credits, to the payee's till (electronic). The payee can check that the correct sum has been transferred by examining a VDU on the till. Of course, it is not necessary to use a mobile telephone as the communication medium, a telephone connected directly to the PSTN could also be used, provided it is equipped with a suitable smart card reader. The system is also suitable for conducting remote transactions from, for example, an individuals house. In this case, a PC equipped with a modem, or another data terminal, could be used.

According to a first aspect of the present invention there is provided an electronic transaction terminal, for use in the conduct of electronic financial transactions, characterized in that said electronic transaction terminal comprises, in combination, a smart card, owned by a payer, on which is stored a plurality of money credits and a communications module for transferring electronic credits from said smart card to a payee, said smart card including storage means for storing electronic credits and transfer means for adding, or removing electronic credits, said communications module including actuation means for generating a signal for the transfer of electronic credits, routing means for generating an address to which said electronic signal should be addressed, a VDU for displaying data relating to a credit transfer, and a key pad for entering details of an electronic transfer, said electronic transaction terminal adapted so that the payer remains in physical control of the smart card at all times during conduct of a transaction.

Access to said smart card may be controlled by use of a PIN.

Said communications module may be adapted to receive a signal representing an electronic receipt for a payment made by said electronic transfer terminal, and transfer details thereof to said smart card, and said smart card includes a second storage means for storing receipts.

Said smart card may carry an encryption algorithm, and all signals for transfer of electronic credits may be encrypted.

Preferably said communications module is a mobile phone, adapted to receive a smart card.

Said smart card may be adapted for insertion into, and connection to, said mobile phone, and may be arranged to act as a SIM for said mobile phone.

According to a second aspect of the present invention there is provided a telecommunications system having a plurality of subscriber equipments characterized in that at least one of said plurality of subscriber equipments is an electronic transaction terminal for use in the conduct of electronic financial transactions, which comprises, in combination, a smart card, owned by a payer, on which is stored a plurality of money credits and a communications module for transferring electronic credits from said smart card to a payee, said smart card including storage means for storing electronic credits and transfer means for adding, or removing electronic credits, said communications module including actuation means for generating a signal for the transfer of electronic credits, routing means for generating an address to which said electronic signal should be addressed, a VDU for displaying data relating to a credit transfer, and a key pad for entering details of an electronic transfer, said electronic transmission terminal adapted so that the payer remains in physical control of the smart card at all times during conduct of a transaction, and in that at least one of said subscriber equipments is an electronic till adapted to receive electronic credits stored on a smart card, said electronic till adapted so that it remains in the physical control of the payee during conduct of a transaction.

Said electronic till may be adapted to issue electronic receipts.

According to a third aspect of the present invention there is provided a smart card, characterized in that it is configured for use with an electronic transaction terminal, for use in the conduct of electronic financial transactions, which comprises, in combination, a smart card, owned by a payer, on which is stored a plurality of money credits and a communications module for transferring electronic credits from said smart card to a payee, said smart card including storage means for storing electronic credits and transfer means for adding, or removing electronic credits, said communications module including actuation means for generating a signal for the transfer of electronic credits, routing means for generating an address to which said electronic signal should be addressed, a VDU for displaying data relating to a credit transfer, and a key pad for entering details of an electronic transfer, said electronic transmission terminal adapted so that the payer remains in physical control of the smart card at all times during conduct of a transaction.

Preferably said smart card is configured for use as an electronic wallet and as a mobile phone SIM.

According to a fourth aspect of the present invention there is provided a method for the transfer of electronic credits using a telecommunications system having a plurality of subscriber equipments in which at least one of said plurality of subscriber equipments is an electronic transaction terminal for use in the conduct of electronic financial transactions, which comprises, in combination, a smart card, owned by a payer, on which is stored a plurality of money credits and a communications module for transferring electronic credits from said smart card to a payee, said smart card including storage means for storing electronic credits and transfer means for adding, or removing electronic credits, said communications module including actuation means for generating a signal for the transfer of electronic credits, routing means for generating an address to which said electronic signal should be addressed, a VDU for displaying data relating to a credit transfer, and a key pad for entering details of an electronic transfer, said electronic transmission terminal adapted so that the payer remains in physical control of the smart card at all times during conduct of a transaction, an in that at least one of said subscriber equipments is an electronic till adapted to receive electronic credits stored on a smart card, said electronic till adapted so that it remains in the physical control of the payee during conduct of a transaction, characterized in that:

a payer enters an amount to be transferred and an address of a payee to which that amount is to be transferred into the communications module;

the communications module causes the amount to be debited from the electronic credits stored on the smart card, and transmits an encrypted signal including the amount and an electronic signature to the address; and the payee's electronic till transmits a signal to the communications module containing an acknowledgment of receipt and an electronic signature.

Alternatively the method may include the following steps:

a payer enters an amount to be transferred, an address of a payee to which that amount is to be transferred, an address of a bank at which the payer has an account and an account number into the communications module;

the communications module transmits a signal indicating the amount to be transferred, the address of the payee, the account number and an electronic signature of the payer to an electronic banking terminal at the bank;

the electronic banking terminal authenticates the electronic signature, debits the account of the payer and credits the account of the payee; and the electronic banking terminal transmits a signal to the electronic till of the payee confirming payment.

BRIEF DESCRIPTION OF THE DRAWINGS

Embodiments of the invention will now be described, by way of example, with reference to the accompanying drawings in which.

In one embodiment of the present invention an electronic transaction terminal consists of a smart card and mobile phone operating in combination. The smart card has electronic credits stored on it, and these can be transferred to an electronic till by means of a communication link established over a telecommunications system. The telecommunications system comprises a mobile network and PSTN (public switched telephone network) operating in tandem. This embodiment of the invention is illustrated in schematic form in FIG. 1.

Figure 1:
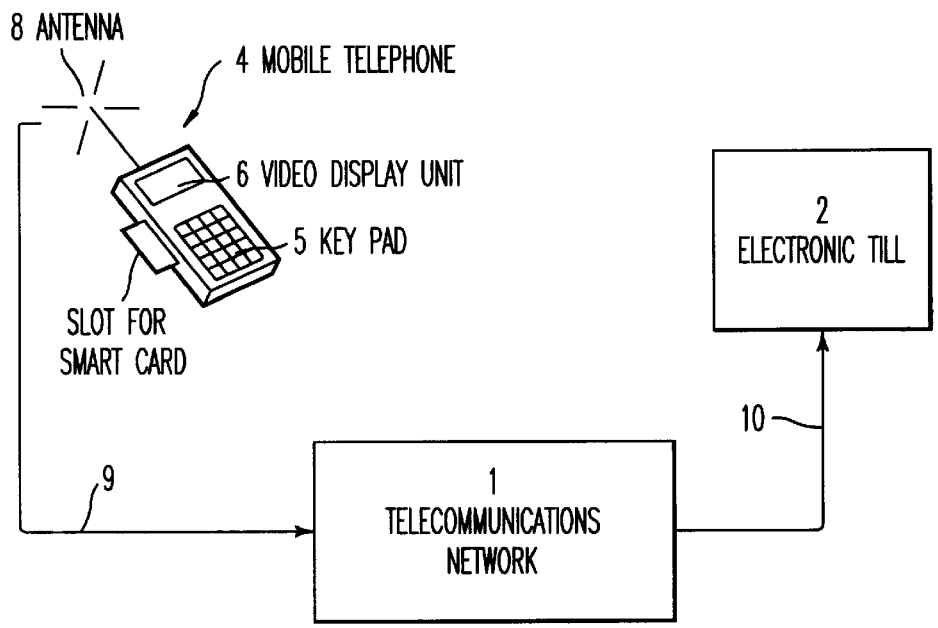
FIG. 1 shows a smart card and mobile telephone, according to the present invention, linked to a retailer's electronic till via the PSTN.

Referring now to FIG. 1, a mobile telephone 4, has a keypad 5, and a VDU (visual display unit) 6. The mobile phone also has a slot for insertion of a smart card 7, shown partly withdrawn from the mobile telephone. When a cash transaction is to be initiated, the smart card, which holds cash credits and acts as an electronic wallet, is inserted into the mobile phone, and the user enters his PIN and a phone number for the payee's electronic till 4, together with an amount to be transferred, by means of the mobile phone's keypad. Entry of the PIN authorises use of the smart card, the remaining data is then communicated to the smart card by the mobile telephone, by means of internal connections within the mobile telephone's smart card slot, or by means of an inductive coupling, or the like. The smart card deducts the amount entered from the total credit held on the smart card and formulates a signal for transmission by the mobile phone to electronic till 2. This signal is then transmitted via the mobile phone's antenna, 8, to a mobile phone base station whence it is transmitted over the mobile network and the PSTN to electronic till 2. The signal transmitted by mobile telephone 4, to electronic till 2, may include an electronic signature encoded by means of an asymmetric cypher and key, which uniquely and securely identifies the smart card. Access to use of the smart card is controlled by use of a PIN (personal identity number) known only to the owner of the smart card.

It is of course necessary to ensure that all signals transmitted between the mobile phone 4, and the electronic till 2, are securely encrypted. One such encryption technique is known as the RSA authentication system (Rivest, Shamir and Adleman public key encryption system). This system may be used both for encryption and provision of a secure electronic signature, although different cypher keys should be sued for these purposes.

On receipt of a credit transfer from smart card 7, which can be regarded as a smart card electronic wallet, or purse, via mobile phone 4, electronic till 2, may transfer a signal containing an electronic receipt, via telecommunications network 1, and mobile phone 4, to the smart card electronic wallet 7. The smart card 7, stores the electronic receipt for subsequent use if needed.

The transaction, i.e. transferring electronics credits, may be given a provisional status until an electronic receipt is received by the mobile phone 4. The transaction may then be analized by a sign off signal transmitted by the mobile phone 4, to the electronic till 2.

Both the electronic till and the mobile phone are equipped with VDUs and these enable progress of the transaction to be monitored by both payee and payer.

Figure 3:
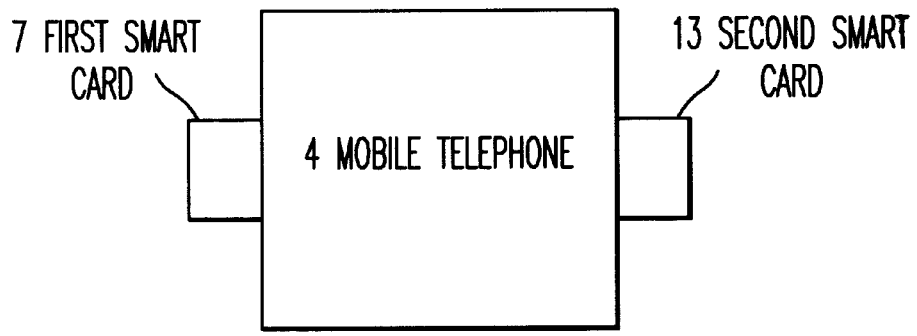
FIG. 3 is a schematic illustration of a mobile phone configured to receive two smart cards.
Figure 4:
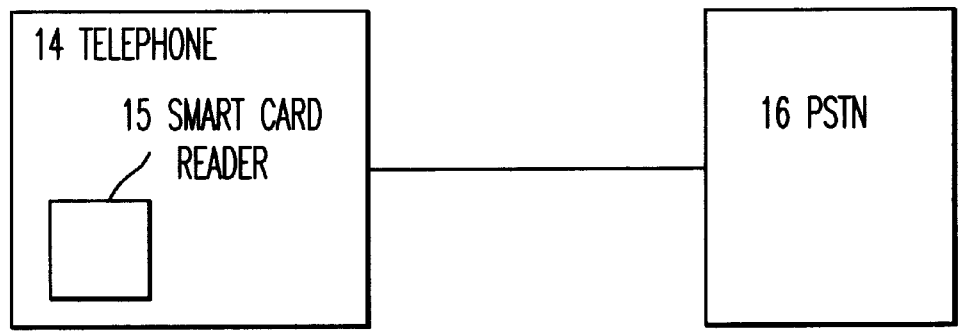
FIG. 4 is a schematic illustration of a telephone connected to a PSTN and comprising a smart card reader.

As described above, the communications link between the payer and the payee is established over a telecommunications system which includes a mobile network. However, it is also possible to use a telephone connected directly to the PSTN which incorporates a smart card reader, such as a payphone. See FIG. 4 showing a telephone 14 comprising a smart card reader 15 connected directly to the PSTN 16. A principle advantage in the use of a mobile telephone is that such units frequently include a slot for insertion of a smart card. In normal use, the smart card acts as a SIM (subscriber information module), and is used to identify a subscriber to a mobile telephone network. The SIM contains subscriber specific information, such as the subscriber's telephone account identification and the premium services which the subscriber is entitled to access. The present invention can be realized by combining the SIM function and electronic wallet function in a single smart card. Alternatively, two smart cards can be used, one functioning as an electronic wallet, and the other as a conventional SIM. See FIG. 3 showing a first smart card 7 and a second smart card 13.

The system can be arranged to permit cash transactions to be conducted so that credits are either debited, or credited, to the smart card 7. This enables the smart card to be topped up with credits by connection to an electronic banking terminal, or an electronic refund, or payment to be made to a smart card.

The advantage of all the embodiments of the present invention is that they permit a payer to make payment from an electronic wallet without any need for the payer to pass his electronic wallet to the payee, or for the payee to pass his electronic till to the payer. This represents a substantial improvement in security. During the conduct of a transaction, the payer is in sole control of the communications module transmitting data to the payee's electronic till. This substantially reduces the risk of fraud.

It is of course possible for the present invention to be used to conduct local electronic credit transfers, e.g. in a shop, or restaurant, or for the conduct of electronic transfers at a distance, e.g. payment of a parking fee at an unattended car lot, or parking meter. In the latter case a telephone number may be displayed in the car lot, and on completion of a payment transaction, a ticket dispenser may dispense a time stamped ticket in response to a signal received by the ticket dispenser over the PSTN.

Another application of the present invention lies in the field of gaming. The electronic wallet may be used to place a cash bet with a bookmaker, turf accountant, or other gaming establishment, in exactly the same way as any other financial transaction is conducted by the electronic wallet. A receipt for the bet is received and stored on the smart card. If successful, the electronic receipt for the bet may be traded for winnings by transmitting a signal to the bookmaker, etc., containing a demand for payment. Payment can then be effected by electronic transfer of credits from the bookmakers electronic till to smart card.

Figure 5:
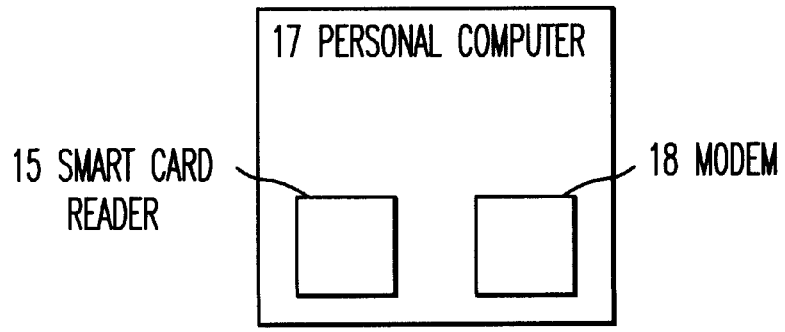
FIG. 5 is a schematic illustration of a personal computer comprising a smart card reader and a modem.

As described above, the electronic transaction terminal of the present invention comprises a smart card operating in combination with a communications module which may be a mobile telephone, or payphone. The advantages in the use of mobile phones, over fixed communications modules, such as a payphone, is clear both from the point of view of the user, and on technical grounds, e.g. the use in mobile phones of SIMs which may be smart cards. The use of encryption techniques in normal digital mobile telephony also simplifies the design problems associated with modifying conventional telephonic apparatus to act as an electronic transaction terminal according to the present invention. However, the present invention still embraces the use of a smart card, in combination with any communications modules capable of connection to a telecommunications network. Such a communications module might include a PC equipped with a modem, or a data terminal, or purpose designed unit. See FIG. 5 showing a PC 17 comprising a smart card reader 15 and a modem 18. Where a PC is used, it could be a conventional PC operating from a fixed location, or laptop PC which is portable. It should be noted, in this connection, that palm sized computers, such as the Psion Series 3, are available and can be equipped with miniature modems. Such a unit can readily be carried in a shirt pocket.

Figure 2:
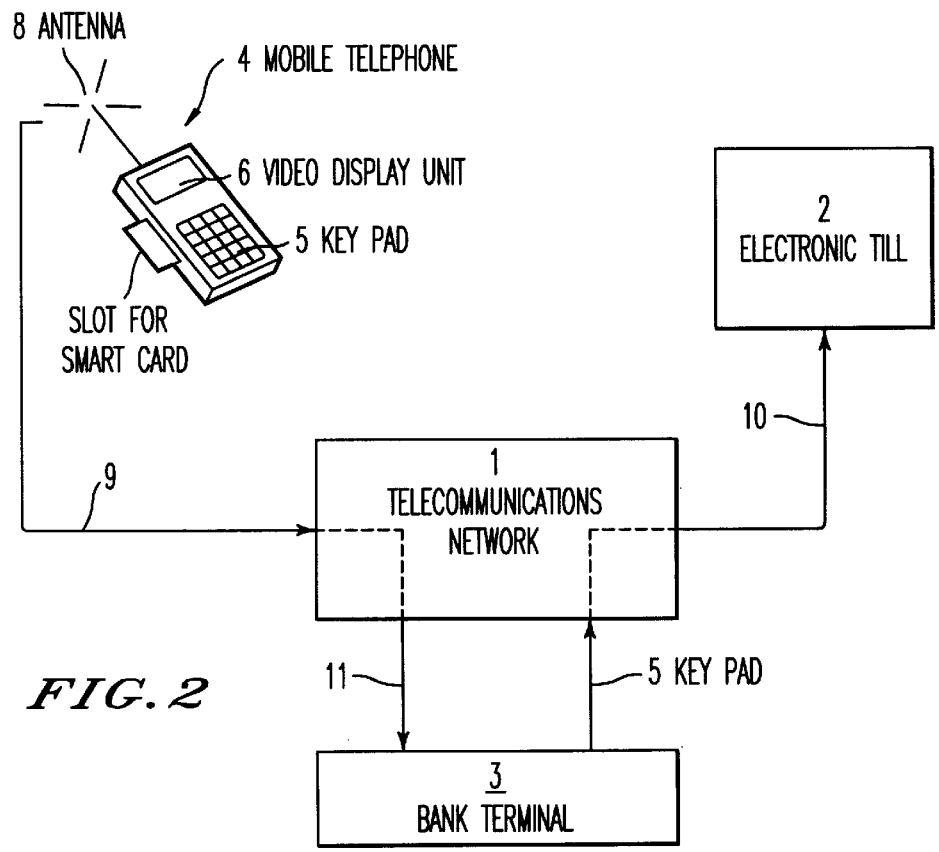
FIG. 2 shows a smart card and mobile telephone, according to the present invention, linked to a bank and thence linked to a retailers electronic till.

In an alternative mode of operation, a smart card electronic wallet can be used to control fund transfer from one bank account to another, so that payment is achieved without debiting electronic credits from those stored on the electronic wallet. This embodiment of the invention is illustrated in FIG. 2. When the owner of a smart card electronic wallet wishes to arrange a credit transfer from his bank account to a payee's account, he inserts the smart card electronic wallet 7, into a mobile phone 4, and enters his PIN using the mobile phones keypad 5. In response to a menu driven series of options and questions generated by the smart card and displayed on the mobile phones VDU 6, the owner enters details of his own bank account and his bank's address, (this information may be pre-stored on the smart card), the amount of money to be transferred and the payee's bank account number. This information is used to formulate a signal containing the following data:

payer's bank account;
payer's electronic signature;
payer's bank account; and
the amount to be transferred.

This signal is then transmitted to an electronic banking terminal 3, at the owners bank. The electronic banking terminal authenticates the owner's electronic signature, transfers the amount of money indicated in the signal to the payee's account, and transmits a signal to the payee's till indicating the amount transferred and the identity of the payer. At the payees electronic till, this information is displayed on the till's VDU, thus enabling the payee to confirm satisfactory completion of the transaction. The electronic banking terminal may also transmit a signal to the smart card 4, confirming completion of the transaction. This signal may be stored in the form of an electronic receipt on the payer's smart card electronic wallet.

What is claimed is:

1. An electronic transaction system for conducting electronic financial transactions, comprising:
a smart card configured to store a plurality of payer electronic credits, comprising,
a storage device configured to store said electronic credits, and,
a computational device configured to debit or credit said electronic credits; and,
a communications module comprising a mobile phone configured to transmit, in response to a transaction between the payer and a party selected from a plurality of addressable parties accessible through a Public Switched Telephone Network (PSTN), said electronic credits from said smart card to said selected party via said PSTN, comprising,
an actuation device configured to generate a signal for transmitting said electronic credits to said party,
a routing device configured to produce an address of said party, a video display unit configured to display credit transfer data, and a keypad configured to enter details for an electronic transfer;

wherein said payer remains in physical control of the smart card at all times during conduct of said transaction and said smart card is configured to act as a subscriber information module (SIM) for said mobile phone.

2. The electronic transaction system of claim 1, wherein said smart card is further configured to store addresses of said plurality of addressable parties.

3. The electronic transaction system of claim 1, wherein said smart card is further configured to be accessible by use of a personal identification number.

4. The electronic transaction system of claim 1, wherein said communication module is configured to receive a signal representing an electronic receipt for a payment made by said communication module and transfer details of said electronic receipt to said smart card, and said smart card further comprises a second storage device for storing said electronic receipts.

5. The electronic transaction system of claim 1, wherein said smart card further comprises an encryption algorithm and said communication module is configured to transmit encrypted signals.

6. The electronic transaction system of claim 5, wherein said encryption algorithm comprises a Rivest, Shamir and Adleman algorithm.

7. Th electronic transaction system of claim 5, wherein said smart card further comprises a signature device configured to generate a secure electronic signature.

8. The electronic transaction system of claim 1, wherein at least one party of said plurality of addressable parties has an electronic till configured to receive said transmitted electronic credits.

9. The electronic transaction system of claim 8, wherein said electronic till is configured to issue electronic receipts.

10. The electronic transaction system of claim 9, wherein at least one party of said plurality of addressable parties comprises an electronic banking terminal configured to process signals relating to electronic money transfers from one bank account to a second bank account.

11. The electronic transaction system of claim 8, wherein said communication module is further configured to transmit through a mobile network.

12. The electronic transaction system of claim 8, wherein at least one party of said plurality of addressable parties has an electronic till associated with a parking meter.

13. The electronic transacting system of claim 8, wherein at least one party of said plurality of addressable parties has an electronic till associated with a restaurant.

14. The electronic transaction system of claim 8, wherein at least one party of said plurality of addressable parties has an electronic till associated with a gaming outlet.

15. A method for transferring electronic credits using a telecommunication system, comprising the steps:

entering into a communication module comprising a mobile phone an amount of electronic credits to be transferred to a party and an address of the party selected from a plurality of addressable parties accessible through a Public Switched Telephone Network to which said amount is to be transferred;

debiting said amount of said electronic credits from an amount of payer electronic credits stored on a smart card reflecting a balance prior to said entering step;

using the smart card as a subscriber information module (SIM) for said mobile phone;

transmitting an encrypted signal including said amount and an electronic signature to the address of said party; and transmitting a response signal from the party to said communicating module, said response signal comprising an acknowledgment of receipt and an electronic signature.

16. The method of claim 15, wherein said transmitting an encrypted signal step further comprises:

using a Rivest, Shamir and Adleman (RSA) algorithm.

17. The method of claim 15, wherein said entering step further comprises:

entering an address of a bank at which the payer has an account and an account number.

18. The method of claim 17, wherein said step of transmitting an encrypted signal further comprises:

transmitting a signal indicating the amount to be transferred, the address of the party, the account number and an electronic signature of the payer.

19. The method of claim 18 wherein said step of transmitting a response signal further comprises:

transmitting a signal to the electronic till of the party confirming payment.

20. The method of claim 19, wherein said step of transmitting an encrypted signal further comprises:

encrypting said transmissions using a RSA algorithm.

* * * * *